Oct. 24, 1950     J. G. SARTIN     2,526,905
LANDING GEAR FOR TRAILERS
Filed June 24, 1948

JARVIS GWYN SARTIN.
INVENTOR.

BY Ernest G. Peterson
AGENT.

Patented Oct. 24, 1950

2,526,905

UNITED STATES PATENT OFFICE 2,526,905

LANDING GEAR FOR TRAILERS

Jarvis G. Sartin, Hattiesburg, Miss., assignor to Hercules Powder Company, Wilmington, Del., a corporation of Delaware Application June 24, 1948, Serial No. 34,945

1 Claim. (Cl. 280—33.4)

This invention relates to landing gears for detachable trailers for trucks and the like.

One object of this invention is to provide a landing gear for detachable trailers which is capable of supporting a full load on soft earth without sinking below operative position for connection to the fifth wheel of the truck.

Another object is to provide a landing gear rugged in structural strength and yet quick acting in both raising and lowering operations.

Another object is to provide a landing gear with such simplicity of design as to be easily constructed and repaired with readily available materials.

Still another object is to provide a landing gear capable of being raised rapidly away from the terrain to provide full road clearance for traversing embankments, ditches, culverts, and other obstructions when in transport position.

A further object is to provide a nonrolling landing gear having sufficient braking action to prevent rolling or movement of the trailer without the truck attached thereto.

Another object is to provide a landing gear with secure locking means for locking the gear in both raised and lowered positions and more particularly for locking the gear in the landing position to prevent accidental operation of the landing gear.

A still further object is to provide a landing gear shoe with a large surface area which can be readily and rapidly set in place.

These objects are attained in the present invention which is described herewith in connection with the accompanying drawings.

Figure 1:
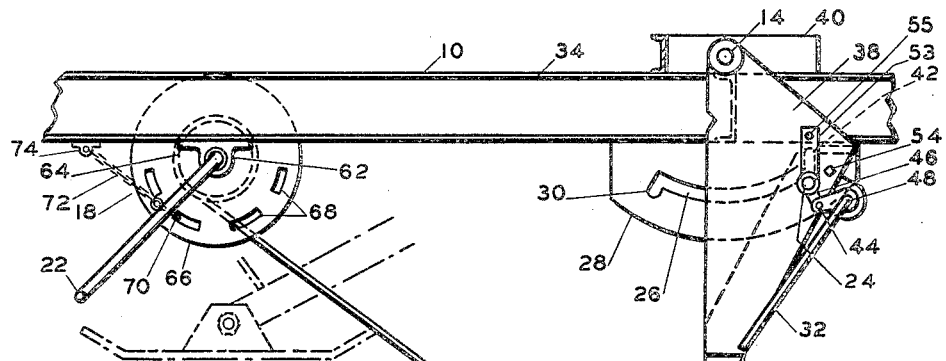
Figure 2:
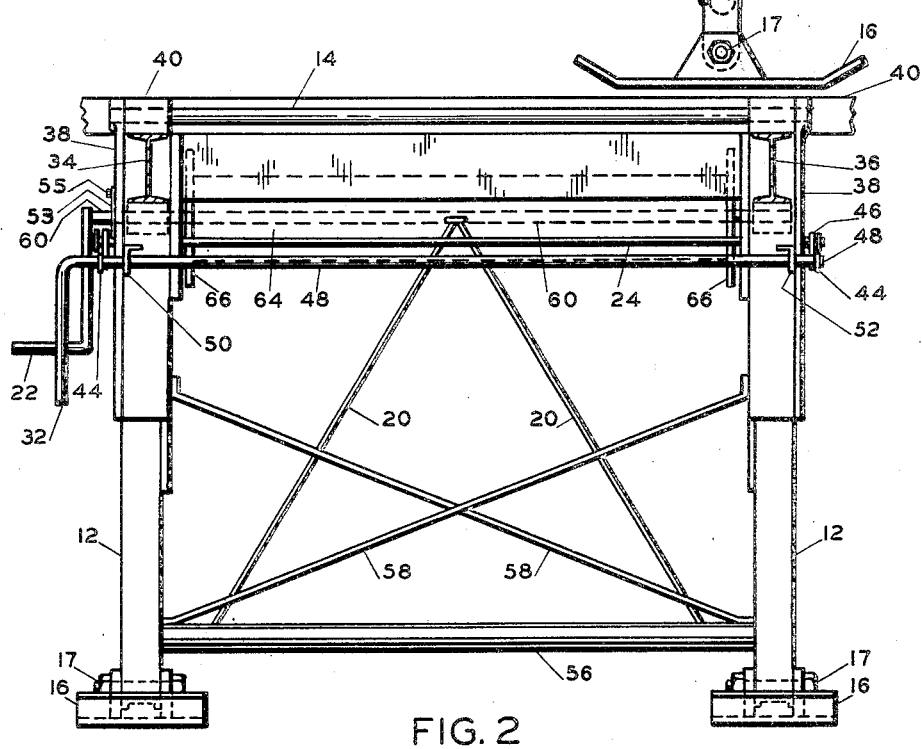

Fig. 1 is a side elevation view of a rearwardly retractable landing gear of this invention and Fig. 2 is an end elevation view of the invention.

In Fig. 1 is shown the forward end of a trailer and the landing gear attached thereto. The frame 10 of the trailer supported on a wheel truck at the rearward end supports at the front end the leg member 12 which is pivotally attached to the frame by a pivot shaft 14. A ground engaging shoe 16 is pivotally attached to the lower end of said leg member by a shoe pin 17 allowing the shoe 16 to swing freely. The landing gear is shown in landing position by the solid lines and in rearwardly retracted position by the broken lines. The windlass 18 fastened to the frame 10 and the cable 20 fastened to the leg member 12 are cranked by the crank handle 22 to draw the leg member 12 into retracted position. The leg member 12 can be lowered into the landing position by allowing the leg member to swing down freely or by slowly unwinding the cable 20 from the windlass 18. The leg member is locked in either the landing or retracted position by means of the lock shaft 24 which passes through an elongated opening in the body of leg member 12 and also passes through the guideway 26 in locking plate 28 which is integral with the frame 10. Guideway 26 has a recess 30 at each end thereof into which lock shaft 24 drops when in position. Locking shaft 24 may be lifted from the recess 30 by means of a handle 32 of an unlocking device carried by said leg member 12.

In Fig. 2 the arrangement of the leg members 12 is shown as a pair of leg members 12 in spaced relationship with the terrain supported on spaced I-beams 34 and 36.

The upper portion of each leg member as shown in Fig. 1 has a side plate 38 in rigid attachment to the pivot shaft 14 which is in turn pivotally mounted in bearing blocks 40. The bearing blocks 40 are in turn rigidly attached to the respective I-beams 34 and 36. The entire load of the trailer is borne by the pivot shaft 14 in its attachment to the side plate 38.

In order to provide for a locking of the leg members 12 in either extended or retracted position a locking plate 28 is rigidly attached to the frame 10 of the trailer and is provided with a guideway 26, said guideway 26 being formed in an arc swung about the center line of the pivot shaft 14. The extreme end portions of the guideway 26 are provided with recesses or detent slots 30 adapted to receive a locking shaft 24. The locking shaft 24 may be allowed to drop into said recesses 30 or may be removed therefrom by manual lifting of the handle 32 of the unlocking device which effects movement resulting in the raising of the locking shaft 24 within an elongated opening 42 in the side plate 38. Said movement is effected through a linkage consisting of a lifting shaft arm 44 and the locking shaft arm 46, said arms 44 and 46 having a pivotal connection therebetween at the ends opposite their points of attachment to their respective shafts. The lifting handle 32 is formed as part of a lifting shaft 48 having said lifting shaft arms 44 rigidly mounted thereon. The lifting shaft is pivotally mounted upon shaft bearing supports 50 and 52 in spaced relationship and in rigid attachment to the leg members 12. A stopping block 54 is rigidly attached to the side plate 38 to form a stop for the movement of the locking shaft arm 46 for limiting the upward travel of the locking shaft 24. A safety latch 53 is pivotally attached by a pivot shaft 55 above the locking shaft 24 in such a position that the safety latch may be pivoted to a position covering elongated opening 42 thereby preventing movement of shaft 24 in the opening 42 and effectively latching shaft 24 in the locked position in the recess of guideway 26. A bracing shaft 56 forms a means of rigidly retaining the leg members in spaced relationship. Rigid cross tie braces 58 are adapted to assist in obtaining a rigid structure capable of withstanding great sidewise loading pressure. A drum-type windlass 18 pivotally mounted on the windlass shaft 60 is supported by the windlass bearing blocks 62 which are in turn rigidly attached to the frame member 10. A windlass crank 22 provides a means by which the windlass drum 64 can be manually rotated in order to wind a pair of spaced cables 20 thereon. Flange plates 66 which are attached to ends of the windlass drum are provided with slots 68 as a means for utilizing a detent to check unwanted rotation of the windlass.

In operation when the leg members 12 are in locked ground engaging position and it is desired to retract the assembly to the transport position, safety latch 53 is pivoted to the position shown in Fig. 1 to permit free movement of shaft 24 in elongated opening 42, the lifting handle 32 is raised and the locking shaft 24 is removed thereby from the recess 30 into a position of free movement along guideway 26. By subsequent operation of the windlass 18 to wind the cable 20 thereon the leg members are raised to a retracted position as shown by the broken line outline in Fig. 1. In order to lock the leg members in the retracted position, the lifting handle 32 is allowed to drop of its own weight and the locking shaft is allowed to drop into the recess 30. Hook 70 attached to chain 72 is then hooked into one of the slots 68 in the flange plate 66 of windlass 18 to prevent unwinding of cable 20. Such a detent is shown in Fig. 1 consisting of a hook 70 attached to one end of a chain 72 which is attached to frame member 10 by means of a connecting member 74 integrally attached to said frame member 10.

The pivotal attachment of the shoes 16 to the lower portions of each leg member 12 provides a means by which firm contact can be made with uneven terrain and the rectangular shape of the shoes 16 provides a relatively large contact area with the terrain. The pivotal attachment of the shoes 16 with the leg members 12 allows the shoes 16 to ride with the ground engaging position of the shoe 16 in a horizontal position giving thereby increased road clearance when the landing gear is in retracted position and giving flexibility to the landing gear when placed in ground engaging position. The turned-up rearward and forward ends of the plate of the shoe 16 aids in the operation of setting the landing gear in ground engaging position and also in withdrawing the landing gear from ground engaging position in that the turned-up edges prevent grabbing of the shoe into the terrain. If desired, the sole of shoeplate 16 may have a rough or corrugated surface to minimize sliding movement when engaged with the ground.

The windlass 18 provides a simple and efficient means for raising the landing gear which also allows rapid lowering of the landing gear by permitting it to fall freely.

In the process of placing the landing gear in ground engaging position for supporting a trailer, it is understood that the forward end of the trailer will be supported upon a suitable truck until the landing gear is lowered into position. When the shoes have been dropped in a position of firm contact with the terrain, the legs are forced into vertical position so that the locking shaft may be dropped into locking position by backing the truck coupled to the trailer a sufficient amount to force the legs into the vertical position. In order to disengage the landing gear from ground engaging position, the reverse procedure is carried out; i. e., the truck is coupled to the trailer, the locking bar is raised from the locking recess, and the truck is pulled forward sufficiently to allow full weight of the forward end of the trailer to be carried by the truck. The landing gear legs are then free of the weight of the load of the trailer and may be readily drawn up into retracted position by operation of the windlass.

The landing gear of this invention is thus seen to be a highly efficient device which may be raised and lowered rapidly with a minimum of lost time and effort. Moreover, its simplicity of design is such that it may be easily constructed and repaired with materials readily available in most mill supply houses.

What I claim and desire to protect by Letters Patent is:

A landing gear adapted to be affixed to the frame of a detachable trailer, said landing gear having in combination: at least one leg member pivotally attached to said frame for free swinging movement between raised transport position and lowered ground engaging load supporting position; a substantially flat ground engaging shoe with turned-up forward and rearward edges hingedly attached to the lower end of said leg member for maintaining a horizontal position of the shoe when in retracted carrying position and during movement of said leg member into ground engaging position in which position the point of pivotal attachment of the leg to the frame is directly above the point of hinged attachment of the leg to the shoe; an arcuate guideway integral with said frame, a locking bar loosely attached to said leg member and movable therewith and slidably mounted in said guideway, a downwardly extending detent slot at each end of said guideway for receiving said locking bar and thereby locking the leg member at one extreme of its swinging movement in the retracted position and at the other extreme in the landing position and lever means for moving said locking bar out of said detent slots into a position of free movement along said guideway; and windlass and cable, said cable being attached to said leg member to provide thereby retracting means for drawing said member into retracted position and releasable at will to allow said leg member to swing into ground engaging position.

JARVIS G. SARTIN.

REFERENCES CITED

The following references are of record in the file of this patent:

UNITED STATES PATENTS

| Number | Name | Date |
| --- | --- | --- |
| 1,049,210 | Cole | Dec. 31, 1912 |
| 1,167,792 | Byron | Jan. 11, 1916 |
| 1,313,087 | Hartwick | Aug. 12, 1919 |
| 1,524,083 | Clement | Jan. 27, 1925 |
| 1,868,021 | Nabors | July 19, 1932 |
| 2,162,181 | Skinner | June 13, 1939 |